United States Patent
Mortensen et al.

(10) Patent No.: US 11,274,657 B2
(45) Date of Patent: Mar. 15, 2022

(54) NACELLE FOR A WIND TURBINE, THE NACELLE COMPRISING SIDE UNITS

(71) Applicant: Vestas Wind Systems A/S, Aarhus N. (DK)

(72) Inventors: Henning Mortensen, Randers (DK); Frank Hansen, Arden (DK); Karsten Buch-Lorentsen, Ry (DK); Peter Haakon À Porta, Aalborg (DK); Erland Falk Hansen, Morke (DK); Mazyar Abolfazlian, Brabrand (DK); Morten Mogensen, Hvidovre (DK)

(73) Assignee: Vestas Wind Systems A/S, Aarhus N. (DK)

( * ) Notice: Subject to any disclaimer, the term of this patent is extended or adjusted under 35 U.S.C. 154(b) by 668 days.

(21) Appl. No.: 15/649,704

(22) Filed: Jul. 14, 2017

(65) Prior Publication Data
US 2017/0314535 A1   Nov. 2, 2017

Related U.S. Application Data

(63) Continuation of application No. 13/636,393, filed as application No. PCT/EP2011/051238 on Jan. 28, 2011, now abandoned.

(30) Foreign Application Priority Data

Mar. 22, 2010 (DK) .......................... PA 2010 70117

(51) Int. Cl.
*F03D 13/20* (2016.01)
*F03D 13/10* (2016.01)
(Continued)

(52) U.S. Cl.
CPC ............. *F03D 13/20* (2016.05); *F03D 13/10* (2016.05); *F03D 80/60* (2016.05); *F03D 80/82* (2016.05);
(Continued)

(58) Field of Classification Search
CPC ...... F03D 13/10; F03D 13/40; F05B 2240/14; F05B 2240/916
See application file for complete search history.

(56) References Cited

U.S. PATENT DOCUMENTS 7,614,850 B2 * 11/2009 Rogall .................... F03D 13/20
416/155
7,735,808 B2 * 6/2010 Viladomiu i Guarro ....................
F03D 80/50
254/278
(Continued)

FOREIGN PATENT DOCUMENTS

DE    102007062622 A1 *  6/2009  ............. F03D 13/25
EP       1101934 A2 *  5/2001  ........... B66C 23/207
(Continued)

OTHER PUBLICATIONS

"Eco 100 talking the torque and getting into good shape for O&M maintainability", published at "Modern Power Systems" on Sep. 1, 2008 (Year: 2008).*
(Continued)

*Primary Examiner* — Justin D Seabe
(74) *Attorney, Agent, or Firm* — Wood Herron & Evans LLP

(57) ABSTRACT

A nacelle for a wind turbine and a method for erecting a wind turbine are disclosed. The nacelle comprises a main unit arranged to be connected to a wind turbine tower, via a yawing arrangement, and at least one side unit mounted along a side of the main unit in such a manner that direct access is allowed between the main unit and the side unit(s), (Continued)

each side unit accommodating at least one wind turbine component, and at least one side unit being capable of carrying the wind turbine component(s) accommodated therein. The main unit and at least one of the side unit(s) are distributed side by side along a substantially horizontal direction which is substantially transverse to a rotational axis of a rotor of the wind turbine. A sufficient interior space of the nacelle is obtained while allowing the nacelle to be transported due to the modular construction. The weight of the wind turbine components is arranged close to the tower due to the transversal arrangement of the side unit(s) relative to the main unit.

28 Claims, 13 Drawing Sheets

Related U.S. Application Data

(60) Provisional application No. 61/316,152, filed on Mar. 22, 2010.

(51) Int. Cl.
*F03D 80/80* (2016.01)
*F03D 80/60* (2016.01)

(52) U.S. Cl.
CPC ..... *F05B 2230/601* (2013.01); *F05B 2240/14* (2013.01); *F05B 2240/916* (2013.01); *Y02E 10/72* (2013.01); *Y02E 10/728* (2013.01); *Y02P 70/50* (2015.11)

(56) References Cited

U.S. PATENT DOCUMENTS

| 7,837,443 | B2 * | 11/2010 | Mikkelsen | F03D 80/30 |
| | | | | 416/146 R |
| 8,142,155 | B2 * | 3/2012 | Numajiri | F03D 13/10 |
| | | | | 29/898.08 |

FOREIGN PATENT DOCUMENTS

| WO | WO-0234664 A1 * | 5/2002 | B66C 23/32 |
| WO | WO-2009033925 A2 * | 3/2009 | F03D 80/60 |
| WO | WO-2010026114 A2 * | 3/2010 | F03D 80/60 |

OTHER PUBLICATIONS

"Alstom Eco100 Guided Tour", screenshot of YouTube video "https://www.youtube.com/watch?v=btr4l1_ZcAQ", Feb. 9, 2015 (Year: 2015).*
"Voltage dips testing campaign in ECO100", Alstom presentation Apr. 20, 2009 (Year: 2009).*
"Thermal optimization of nacelles", thermal analysis performed from 2006-2008 (Year: 2008).*

\* cited by examiner

NACELLE FOR A WIND TURBINE, THE NACELLE COMPRISING SIDE UNITS

FIELD OF THE INVENTION

The present invention relates to a nacelle for a wind turbine, the nacelle comprising a main unit and at least one side unit mounted on a side of the main unit. The nacelle of the present invention is particularly suitable for use in large wind turbines. The present invention further relates to a method for erecting a wind turbine comprising such a nacelle.

BACKGROUND OF THE INVENTION

Over the past years there has been a tendency for wind turbines to increase in size, in terms of nominal power output as well as in terms of physical dimensions of the individual parts of the wind turbine. As a consequence, the size of the nacelle must also be increased in order to ensure that the nacelle is capable of accommodating the required wind turbine components.

Wind turbines are normally transported from the location or locations of manufacture of the individual parts to the operating site where the wind turbine is supposed to be erected. Accordingly, as the size of the wind turbines, and thereby the size of the individual parts of the wind turbines, increases it becomes increasingly difficult to transport the parts to the operating site, and the dimensions of roads, transport vehicles etc., impose an upper limit to the size of parts which it is possible to transport. It is therefore desirable to be able to divide some of the larger parts of the wind turbine into smaller modules during transport of the parts to the operating site.

EP 2 063 119 discloses a module of a nacelle of a wind turbine, which is separately designed, manageable and comprises a housing part. The module is connectable to at least one further module of the nacelle, which is also separately designed, manageable and has a housing part. The housing part of the module builds in the assembled status of the nacelle, which comprises several modules, a part of the housing of the nacelle. The modules disclosed in EP 2 063 119 are arranged one behind the other along a direction defined by the rotational axis of the rotor of the wind turbine. This has the consequence that some of the modules are arranged with a relatively long distance to the tower which carries the nacelle. Thereby the loads, in particular in the form of torque, introduced by these modules become relatively high, and the requirements to the strength of the construction of the nacelle as well as of the tower are increased.

DE 10 2007 062 622 A1 discloses a wind turbine comprising a rotor with at least one rotor blade, a tower and a nacelle mounted on the tower. The nacelle comprises a machine house accommodating the drive train of the wind turbine, and a housing module accommodating electrical means of the wind turbine. The housing module is mounted on the wind turbine via a first attachment portion between the housing module and the machine housing, and a second attachment portion between the housing module and the yawing arrangement. The housing module is arranged below the machine housing.

DESCRIPTION OF THE INVENTION

It is an object of embodiments of the invention to provide a nacelle for a wind turbine, the nacelle being transportable using ordinary transport means, without limiting the possible size of the nacelle.

It is a further object of embodiments of the invention to provide a nacelle for a wind turbine, in which the torque loads on the nacelle are reduced as compared to prior art nacelles with the same or similar dimensions.

It is an even further object of embodiments of the invention to provide a method for erecting a wind turbine without the requirement of a large crane, and without imposing limits on the total size of the nacelle of the wind turbine.

According to a first aspect the invention provides a nacelle for a wind turbine, the nacelle comprising:

a main unit arranged to be connected to a wind turbine tower, via a yawing arrangement, at least one side unit mounted along a side of the main unit in such a manner that a direct access is allowed between the main unit and the side unit(s), each side unit accommodating at least one wind turbine component, and at least one side unit being capable of carrying the wind turbine component(s) accommodated therein, wherein the main unit and at least one of the side unit(s) are distributed side by side along a substantially horizontal direction which is substantially transverse to a rotational axis of a rotor of the wind turbine.

In a first aspect the present invention relates to a nacelle for a wind turbine. Modern wind turbines comprise a tower construction mounted on a foundation on the ground or, in case of off-shore wind turbines, a foundation on the seabed or a floating foundation. A nacelle is mounted on the top of the tower construction, via a yawing arrangement, in such a manner that the nacelle can rotate about a substantially vertical yawing axis in order to allow the blades of the wind turbine to be directed into the wind. The nacelle carries a rotor having a set of wind turbine blades mounted thereon. The blades catch the wind, thereby causing the rotor to rotate, and the rotational movements of the rotor are transformed into electrical energy in a generator, e.g., via a gear arrangement. The nacelle further defines a housing or enclosure accommodating various wind turbine components, such as a generator, one or more converters, a drive train, e.g., including a gear arrangement, various electrical components, cooling equipment, hydraulic components, lifting equipment, etc.

The nacelle of the invention comprises a main unit and at least one side unit. The main unit is arranged to be connected to a wind turbine tower via a yawing arrangement. Thus, the main unit forms the part of the nacelle which is connected to the tower, and it is rotatable with respect to the tower due to the yawing arrangement, as described above.

Each side unit is mounted along a side of the main unit in such a manner that direct access is allowed between the main unit and the side unit(s), i.e., a side unit is a unit which is mounted next to or along a side of the main unit. Accordingly, when the side unit(s) is/are mounted on the main unit, personnel is allowed to move around in an interior nacelle space which is larger than the interior space defined by the main unit, as well as larger than the interior space defined by each of the side unit(s), since the personnel is allowed to gain access to the interior of the main unit as well as to the interior of the side unit(s). This makes it easy to accommodate the various wind turbine components in the nacelle in a manner which allows personnel to gain access to the components or move around the components, even if the components have considerable sizes. Furthermore, a nacelle defining an interior space of a sufficient size is provided, and it is possible to transport the nacelle to the operating site by means of traditional transport means, because the main unit and the side unit(s) can be transported independently of each other.

Direct access between the main unit and the side unit(s) may, e.g., be obtained by mounting at least one side of the main unit in such a manner that a common interior space is defined by the main unit and the side unit(s). According to this embodiment, one large interior space is defined in the nacelle. The common interior space of the nacelle may advantageously be formed by leaving the sides of the main unit and the side unit(s) which face each other completely open or almost completely open, thereby allowing substantially free passage between the main unit and the side unit(s).

It should be noted that even though, according to this embodiment, a common interior space is defined by the main unit and the side unit(s) of the nacelle of the present invention, it is not ruled out that one or more of the wind turbine components which are accommodated in the nacelle is/are enclosed in or covered by separate rooms, units, racks etc. For instance, it may be desirable to enclose a transformer in this manner, e.g., for safety reasons.

As an alternative, direct access between the main unit and the side unit(s) may be obtained by providing door openings in walls defined between the main unit and the side unit(s), thereby allowing personnel to move between the interior of the main unit and the interior of the side unit(s) via such door openings. This embodiment is advantageous with respect to temperature control inside the nacelle.

The side unit(s) may be mounted along a side of the main unit in such a manner that each of the side unit(s) can be moved directly between the mounted position at the nacelle and a base level of the wind turbine. The base level is preferably a level which is arranged at or near the foot of the tower of the wind turbine, and it may, e.g., be the ground level in the case that the wind turbine is arranged on land. Alternatively, it may be a sea level, or it may be a level defined by a transporting vessel, such as a truck or a barge, adapted to carry a side unit during transport to the operating site of the wind turbine. In any event it should be understood that the base level is normally arranged at a level which is lower than the level of the nacelle. It is noted that the main unit, the side unit(s) the rotor, the wind turbine blades and/or any wind turbine component accommodated in the nacelle may be delivered by means of airborne vessels, such as a helicopter or an airship.

Thus, according to this embodiment, movements of a side unit between the mounted position at the nacelle and a base level include substantially vertical movements in a downwards direction from the nacelle towards the base level, as well as substantially vertical movements in an upwards direction from the base level towards the nacelle. The side unit(s) can be moved directly between these two positions, i.e., it/they can be lowered from or hoisted to the mounted position at the nacelle along a substantially vertical direction, without having to move the side unit(s) in a sideways or substantially horizontal direction. This is an advantage because it allows the side unit(s) to be moved by means of hoisting equipment arranged in the nacelle, thereby avoiding the need for an external crane for mounting, repair or replacement of the side unit(s) and/or of one or more wind turbine components accommodated in the side unit(s).

Each side unit accommodates at least one wind turbine component. In the present context the term "wind turbine component" should be interpreted to mean components which are required for operation of the wind turbine, and which are normally arranged in the nacelle, or which may advantageously be arranged in the nacelle. Thus, the term 'wind turbine component' includes, but is not limited to, transformer, converter, generator, control units, hydraulic units, cooling modules, main shaft, various bearings, gear arrangement, etc. It is an advantage that one or more of the wind turbine components is/are accommodated in the side unit(s), since it allows the common interior space defined by the units to be utilized to the greatest possible extent. Furthermore, it allows wind turbine components to be hoisted to the nacelle along with the side unit(s) during erection of the wind turbine, or in the case that one or more wind turbine components need to be replaced. Thereby the total weight which needs to be lifted to the top of the tower during erection of the wind turbine is divided into smaller portions, and the requirements on the lifting equipment can be lowered. This reduces the costs involved with erection of, decommissioning of and/or service on the wind turbine, since cheaper lifting equipment can be used.

At least one side unit is capable of carrying the wind turbine component(s) accommodated therein. Thus, at least one side unit has a structure which allows it to carry the wind turbine component(s) without the wind turbine component(s) being supported by the main unit or the tower, except via the side unit.

The main unit and at least one of the side unit(s) are distributed side by side along a transverse direction of the nacelle, i.e., along a direction which is substantially horizontal and substantially transverse to a rotational axis of the rotor of the wind turbine. This is contrary to the situation disclosed in EP 2 063 119, where the nacelle modules are arranged one behind the other along a direction defined by the rotational axis of the rotor. It is also contrary to the situation disclosed in DE 10 2007 062 622 A1, where the housing module is arranged below the machine house. It is an advantage that the main unit and the side unit(s) are distributed along a transverse direction, because it allows the side unit(s), and thereby the wind turbine components accommodated in the side unit(s), to be arranged close to the tower of the wind turbine. Since the tower carries the nacelle, positioning as much of the weight as possible as close as possible to the tower reduces the loads, in particular torque loads, in the nacelle. As a consequence, the requirements to the strength of the nacelle are reduced, thereby allowing the weight of the nacelle structure to be reduced. As a consequence, the loads transferred to the tower are also reduced, thereby reducing the requirements to the strength of the tower and allowing a reduction of the weight of the tower construction. All in all this introduces considerable reductions in the costs of the wind turbine, since the costs of materials as well as the costs involved with transport of the parts are reduced. It is also an advantage that the main unit and the side unit(s) are distributed along a substantially horizontal direction, because it allows a better utilization of the space defined by the main unit and the side unit(s), since it is possible to obtain one common floor of the entire interior part of the nacelle, thereby allowing personnel to move easily inside the nacelle.

In a preferred embodiment the nacelle comprises two side units, one mounted on a left side of the main unit and one mounted on a right side of the main unit, as seen in the direction of the rotational axis of the rotor of the wind turbine. However, it should be noted that alternative mutual positions of the units should also be regarded as falling within the scope of the present invention.

At least one side unit may accommodate at least one wind turbine component arranged in a closed compartment, said closed compartment being arranged in the side unit. In the present context the term 'closed compartment' should be interpreted to mean an entity or a housing defining an interior part which is separated from the remaining part of the interior of the side unit having the closed compartment arranged therein, e.g., by means of substantially solid walls. Thereby it is possible to control the environment inside the closed compartment independently of the environment in the remaining part of the nacelle, e.g., with respect to temperature, humidity, pressure, etc. This makes it easy to control the environment inside the closed compartment to suit the wind turbine component(s) arranged therein, and by applying two or more closed compartments, each accommodating one or more wind turbine components, it is possible to provide different temperature, humidity and/or pressure to different wind turbine components, thereby allowing each wind turbine component to be accommodated under conditions which are optimal for that wind turbine component without taking other wind turbine components requiring other environmental settings into consideration.

Furthermore, arranging one or more wind turbine components in closed compartment(s) which is/are in turn arranged in the side unit(s) of the nacelle, allows the wind turbine component(s) to be mounted in the compartment(s) at the manufacturing site, and to be transported to the operating site of the wind turbine in the compartment(s). During the erection of the wind turbine at the operating site, the compartment(s) can be positioned directly in the side unit(s), along with the wind turbine component(s) accommodated therein. This makes it very easy to install the wind turbine component(s) in the nacelle. The closed compartment(s) may even be positioned in the side unit(s) at the manufacturing site or at an assembly site, and transported to the operating site inside the side unit(s).

At least one closed compartment may provide a sealing enclosure for the wind turbine component(s) accommodated therein. In this case, the closed compartment prevents liquid or moisture from passing between the interior of the closed compartment and the remaining part of the interior of the side unit having the closed compartment arranged therein. Thus, in the case that the closed compartment accommodates a wind turbine component which must not get into contact with liquid, e.g., electrical equipment, the closed and sealed compartment prevents liquid, such as rain water or liquid originating from other wind turbine components, from entering the interior part of the closed compartment, thereby preventing the liquid from reaching the wind turbine component. Thereby the wind turbine component is protected. Similarly, in the case that the closed compartment accommodates a wind turbine component which produces or uses liquid, such as hydraulic oil or cooling water, such liquid is prevented from leaving the closed and sealed compartment, and it is thereby prevented that such liquid reaches other wind turbine components or leaks to the environment.

At least one closed compartment may provide electromagnetic shielding for the wind turbine component(s) arranged in the compartment. According to this embodiment, the wind turbine component(s) accommodated in the closed compartment(s) is/are protected against electromagnetic interference (EMI) and/or damage caused by lightning strikes. The electromagnetic shielding may, e.g., be obtained by producing the closed compartment at least partly from an electrically conducting material, such as a metal. Thereby the closed compartment functions as a Faraday cage. This embodiment is particularly useful in the case that sensitive electrical equipment is accommodated in the closed compartment.

At least one compartment may be provided with a door allowing access to the wind turbine component(s) arranged in the compartment. According to this embodiment, the interior of the closed compartment may be completely separated from the remaining part of the interior of the side unit having the compartment arranged therein during normal operation. However, in the case that inspection, maintenance and/or replacement of one or more wind turbine components accommodated in the closed compartment is required, the door can be opened, thereby providing access to the wind turbine component(s) for the maintenance personnel.

The main unit may comprise at least one beam, each beam being connectable to lifting equipment for mounting and/or demounting the main unit on/from the wind turbine tower. According to this embodiment, the main unit may be hoisted to the operating position on top of the wind turbine tower during erection of the wind turbine by connecting the beam(s) to lifting equipment and hoisting the main unit by means of the lifting equipment and via the beam(s). Similarly, the main unit may be demounted from the wind turbine tower by means of lifting equipment and via the beam(s), e.g., in the case that the wind turbine is to be decommissioned or the main unit needs to be replaced. It is an advantage of this embodiment that the main unit can be mounted and/or demounted on/from the wind turbine tower via one or more parts which form a part of the main unit, i.e., the beam(s), because the mounting/demounting of the main unit thereby becomes very easy.

The beam(s) may form part of a hoisting arrangement for hoisting and/or lowering wind turbine components and/or side unit(s) to/from the nacelle. The beam(s) may, e.g., be or form part of a structural or carrying part of the hoisting arrangement. For instance, one or more winches or the like may be mounted on the beam(s), the beam(s) thereby carrying the load of a wind turbine component or side unit being hoisted to or lowered from the nacelle. The beam(s) may be arranged on the main unit in such a manner that it/they extend beyond a side of the main unit towards the position of a side unit. A hoisting arrangement mounted on such a beam will thereby be capable of hoisting or lowering a side unit directly to or from the nacelle as described above.

Alternatively or additionally, the beam(s) may be adapted to carry at least one of the wind turbine component(s) accommodated in one of the side unit(s). According to this embodiment, the wind turbine component(s) may be mounted on or attached to the beam(s) once it/they has/have been hoisted to the nacelle. Thereby the beam(s) carry the wind turbine component(s), and the loads arising from the wind turbine component(s) are thereby transferred to the main unit. The requirements to the strength of the side unit(s) may thereby be lowered, since the loads arising from the heavy wind turbine components are carried by the main unit.

As an alternative, the wind turbine component(s), possibly accommodated in one or more closed compartments as described above, may be carried by a supporting structure which supports the wind turbine component(s) from below.

As mentioned above, at least one of the wind turbine component(s) accommodated by a side unit may be a transformer. The side unit accommodating a transformer may, in this case, further accommodate a converter. The converter may be arranged adjacent to the transformer and adjacent to a generator of the wind turbine. This is an advantage, because it reduces the routing of cabling and provides simple electric transmission pathways, thereby minimizing the current path between the generator and the transformer. Consequently, the current losses introduced by the cables are also minimized.

Furthermore, arranging the converter and the transformer in the same side unit has the advantage that it allows the transformer and the converter to be mounted in this side unit and connected to each other prior to hoisting the side unit to the nacelle, e.g., at a manufacturing site. This makes it very easy to install these components at the operating site during erection of the wind turbine.

The transformer may be arranged at a position near the yawing arrangement. Since the transformer is normally a relatively heavy wind turbine component, it is an advantage to arrange it as close as possible to the yawing arrangement, and thereby to the wind turbine tower, since the torque loads on the nacelle and the tower arising from the weight of the transformer can thereby be minimized. Other wind turbine components which are less heavy may then be arranged further away from the wind turbine tower, and the total loads on the nacelle and the tower can thereby be minimized.

At least one of the wind turbine component(s) accommodated by a side unit may be an onboard crane. According to this embodiment, an onboard crane is available in the nacelle, e.g. for moving the wind turbine components accommodated by the main unit and the side unit(s).

As an alternative, an onboard crane may be accommodated by the main unit.

According to one embodiment, the nacelle may comprise at least two side units, a first side unit accommodating one or more electrical wind turbine components, and a second side unit accommodating one or more liquid containing wind turbine components. According to this embodiment, the electrical wind turbine components are arranged in the vicinity of each other, thereby minimizing the routing of cabling as described above. Furthermore, the electrical wind turbine components are kept separate from the liquid containing wind turbine components. This increases the safety of the wind turbine, since the risk of liquids getting into contact with electrical components is reduced considerably. Liquid containing wind turbine components may include, but are not limited to, hydraulic equipment, cooling modules, fire protection equipment and/or lubricating systems. Accommodating related liquid containing wind turbine components, for instance components requiring hydraulic liquid, in the same side unit furthermore has the advantage that an optimal routing of the liquid can be obtained, minimizing the liquid pathways, similarly to the advantages obtained by arranging the electrical wind turbine components in the vicinity of each other.

At least one side unit may extend substantially along the entire length of the main unit. In this case the length of the nacelle, i.e., the distance from the rotor to the rear wall of the nacelle, is defined by the length of the main unit as well as the length of said side unit, said lengths being substantially identical. In this case the nacelle can be easily assembled at the operating site in a manner defining a common interior space of the nacelle. Alternatively or additionally, two or more side units may be arranged side by side along the length of the main unit and facing the same side of the main unit. Furthermore, it could be envisaged that two or more side units may be arranged one on top of the other along a side of the main unit.

An interface defined by the main unit towards a side unit may be connectable to a corresponding interface of a crane, upon removal of the side unit. According to this embodiment, in the case that a larger crane is required at the wind turbine, a side module can be lowered by means of hoisting equipment arranged in the nacelle, and the crane may subsequently be hoisted to the nacelle, using the same hoisting equipment. Once the crane has been hoisted to the nacelle it can be mounted on the main unit, using the same interface which is used for mounting the side unit on the main unit. This makes it very easy to provide the larger crane, and the use of large, ground based cranes can be avoided. A larger crane as described above may, e.g., be required in order to hoist/lower heavy components, such as gear, drivetrain, generator or rotor blades, to/from the nacelle. The interface defined by the main unit may, e.g., include one or more flanges and/or one or more bolt openings allowing the side unit or the crane to be mounted on the main unit.

The side unit(s) may be adapted to accommodate the wind turbine component(s) during transport from a manufacturing location to a wind turbine site. According to this embodiment, the wind turbine components may be mounted in the side unit(s) at the manufacturing location, and the side unit(s) may then be transported to the wind turbine site or operating site along with the wind turbine components which have been mounted therein. This facilitates the process of mounting the wind turbine components considerably, since it is much easier to mount the wind turbine components while the side unit(s) is/are located on the ground and indoors than it is to mount them when the side unit(s) is/are located at the top of the wind turbine tower at the operating site of the wind turbine. Furthermore, a side unit and all the wind turbine components accommodated therein can be hoisted to the nacelle in one go, thereby reducing the amount of time required for erecting the wind turbine at the operating site.

According to one embodiment, two side units, each accommodating one or more wind turbine components, may be joined together at the manufacturing location in such a manner that a substantially closed unit is formed. This closed unit may subsequently be transported to the operating site of the wind turbine, where the side units are once again separated before they are hoisted to the nacelle and mounted on the main unit.

Alternatively or additionally, the side unit(s) may comprise connecting means allowing (a) transportation cover(s) to be attached to the side unit(s) during transport of the side unit(s), e.g., from a manufacturing location to a wind turbine site. According to this embodiment, the transportation cover may be attached to a side unit at the manufacturing site, and the side unit, with the transportation cover attached thereto, can be transported to the operating site of the wind turbine. The transportation cover protects the side unit as well as the wind turbine component(s) accommodated therein during the transport. When the side unit arrives at the operating site of the wind turbine, the transportation cover can be removed before the side unit is mounted on the main unit of the nacelle.

The transportation cover may substantially enclose the entire side unit. As an alternative, the transportation cover may only partly enclose the side unit. This may, e.g., be the case if the side unit is provided with a cover or a cover part which forms part of a nacelle cover during operation of the wind turbine. In this case the transportation cover may only cover the parts of the side unit which are not already covered by the cover or cover part, and the side unit may be entirely covered by the cover or cover part and the transportation cover in combination during transportation. The parts of the side unit covered by the transportation cover may, e.g., include an interface of the side unit towards the main unit.

The nacelle may further comprise a cover covering at least part of the main unit and at least part of at least one of the side unit(s). According to this embodiment, a common cover is provided to at least partly cover the main unit as well as at least one of the side unit(s). Thereby the nacelle, with the main unit and the side unit(s), appears as a single unit of the wind turbine, even though the main unit and the side unit(s) are structurally separate parts.

As an alternative, the nacelle may further comprise a main cover covering at least part of the main unit, and at least one side cover covering at least part of a side unit. According to this embodiment, the main unit and the side unit(s) are provided with separate covers. The main cover and the side cover(s) may be joined together during erection of the wind turbine or assembly of the nacelle, in such a manner that they form a boundary between the interior of the nacelle and the exterior. As described above, the separate covers may be useful for at least partly covering the main unit and the side unit(s) during transport from the manufacturing site to the operating site of the wind turbine.

At least one cover may be provided with at least one opening allowing passage of wind turbine components. The opening may advantageously be provided with a closing element, e.g., in the form of a door, a hatch or the like, in which case the nacelle may be completely enclosed during normal operation, and access can be gained to the interior of the nacelle by opening or removing the closing element, when this is required.

According to one embodiment, at least one side unit may be mounted along a first side of the main unit and a cooling device having a cooling area may extend from a second side of the main unit, the second side being arranged opposite to the first side. According to this embodiment, a side unit and a cooling device are mounted on opposing sides of the main unit. The cooling device provides cooling for one or more heat producing components of the nacelle, such as a generator, a transformer, a gear box, a frequency converter, etc.

The nacelle may comprise a cooling cover having at least one inner face, the cooling device being enclosed by a face of the second side of the main unit and the inner face of the cover. The present invention further relates to a wind turbine comprising a nacelle according to the first aspect of the invention.

According to a second aspect the invention provides a method for erecting a wind turbine, said wind turbine comprising a nacelle according to the first aspect of the invention, the method comprising the steps of:

erecting a wind turbine tower, mounting a main unit on the wind turbine tower, via a yawing arrangement, hoisting at least one side unit, along with at least one wind turbine component accommodated therein, to a position adjacent to the main unit, and connecting the side unit to the main unit in such a manner that a common interior nacelle space is defined by the main unit and the side unit(s).

It should be noted that a person skilled in the art would readily recognize that any feature described in combination with the first aspect of the invention could also be combined with the second aspect of the invention, and vice versa.

The method may further comprise the step of transporting at least one side unit accommodating at least one wind turbine component from a manufacturing location to a wind turbine site, prior to performing the step of hoisting the side unit(s).

The step of connecting the side unit to the main unit may be performed in such a manner that the main unit and the side unit are distributed side by side along a substantially horizontal direction which is substantially transverse to a rotational axis of a rotor of the wind turbine. This has already been described above with reference to the first aspect of the invention, and the remarks set forth above are equally applicable here.

As an alternative, a wind turbine comprising a nacelle according to the first aspect of the invention may be erected in the following manner. The main unit and the side unit(s) are manufactured separately and transported to an assembly location, e.g., at a port or harbour. The main unit and the side unit(s) are then assembled at the assembly location to form the nacelle, and the assembled nacelle is transported to the operating site of the wind turbine where it is mounted on a tower construction. This approach may be desirable in the case that the operating site is an offshore site, since the assembled nacelle can in this case be transported by means of a ship or a barge, where it is possible to transport larger items than it is using trucks. Furthermore, it is desirable that the assembly of the nacelle can take place on ground rather than at the offshore site.

BRIEF DESCRIPTION OF THE DRAWINGS

The invention will now be described in further detail with reference to the accompanying drawings, in which.

DETAILED DESCRIPTION OF THE DRAWINGS

Figure 1:
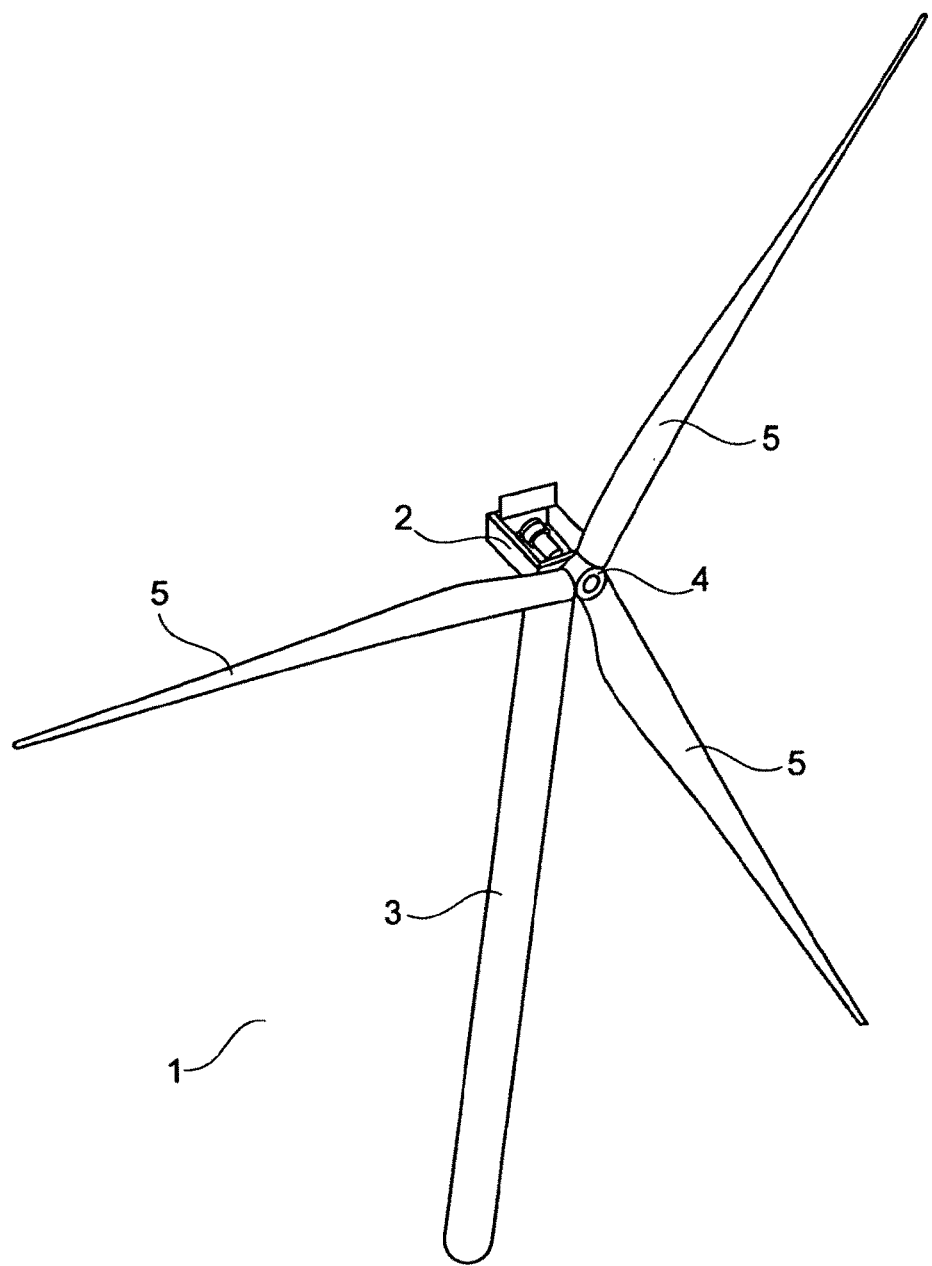
FIG. 1 is a perspective view of a wind turbine having a nacelle according to an embodiment of the invention mounted at a tower thereof.

FIG. 1 is a perspective view of a wind turbine 1 having a nacelle 2 according to an embodiment of the invention mounted on a tower 3 thereof. A hub 4 carrying three rotor blades 5 is mounted at the nacelle 2. A top part of the nacelle 2 has been removed for the sake of clarity, thereby revealing the interior parts of the nacelle 2. Inside the nacelle 2 a gear arrangement 6 is accommodated. The nacelle 2 is described in further detail below with reference to FIGS. 2-6.

Figure 2:
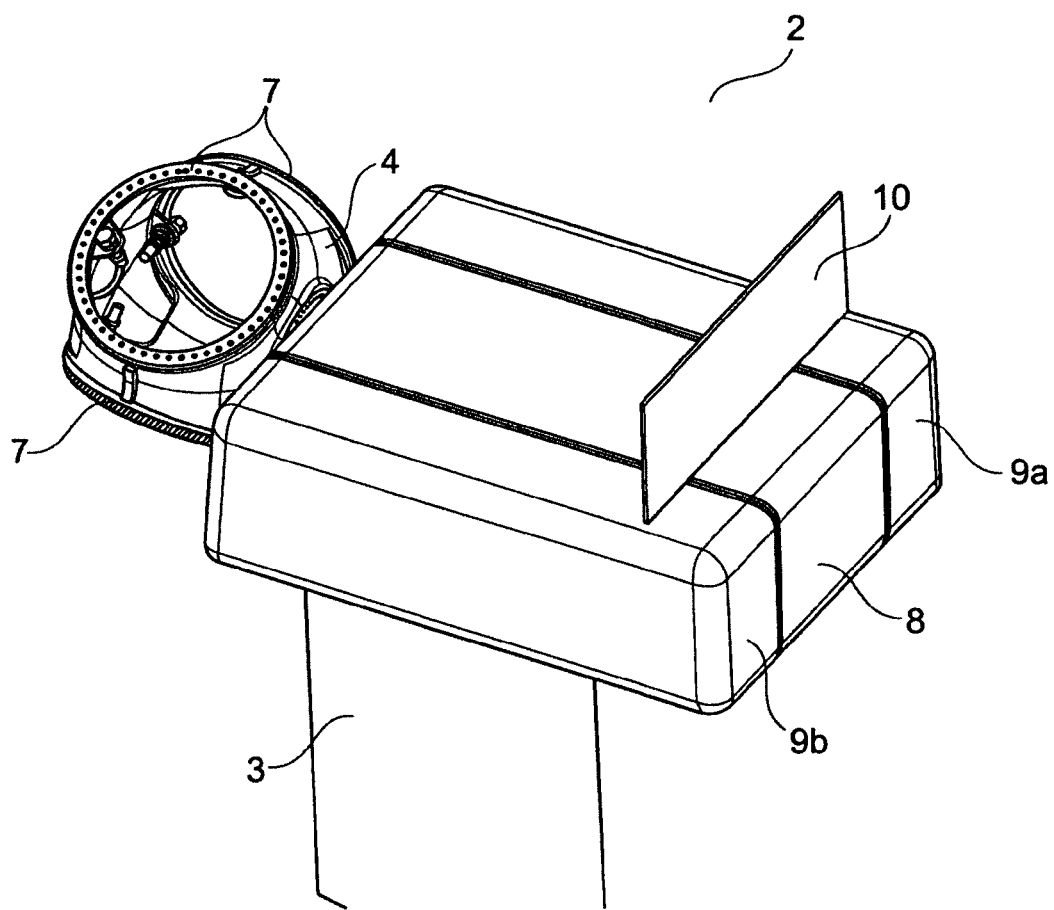
FIG. 2 is a perspective view of a nacelle according to a first embodiment of the invention.

FIG. 2 is a perspective view of a nacelle 2 according to a first embodiment of the invention. A hub 4 is mounted on the nacelle 2, and is provided with three blade flanges 7, each being adapted to be connected to a corresponding flange of a rotor blade (not shown). The nacelle 2 comprises a main unit 8 and two side units 9a, 9b. A cooling area 10 is arranged on top of the nacelle 2.

The main unit 8 is mounted on a tower 3 via a yawing arrangement (not shown), allowing the nacelle 2 to rotate in order to direct rotor blades carried by the hub 4 into the wind.

Figure 3:
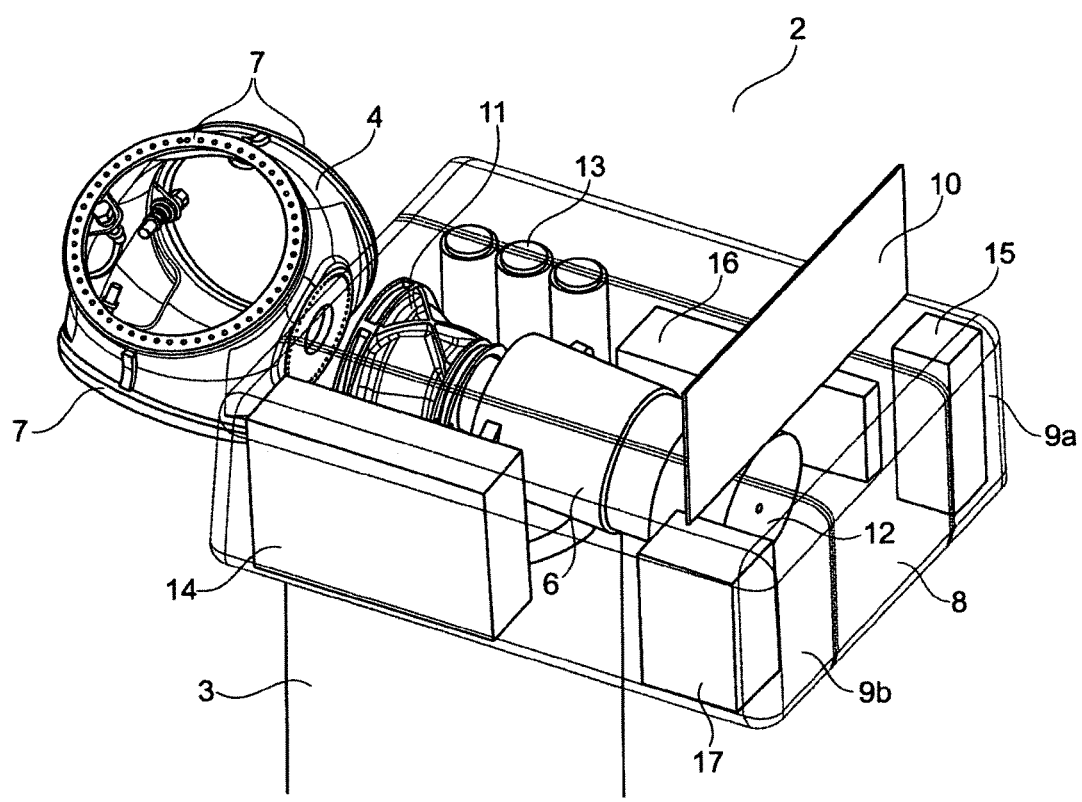
FIG. 3 is a perspective view of the nacelle of FIG. 2, wherein wind turbine components accommodated in the nacelle are visible.

FIG. 3 is a perspective view of the nacelle 2 of FIG. 2. In FIG. 3 the outer walls of the nacelle 2 are transparent, thereby revealing the interior parts of the nacelle 2 and the wind turbine components accommodated therein. The main unit 8 accommodates a main bearing unit 11, a gear arrangement 6 and a generator 12, arranged sequentially behind the hub 4, along a direction defined by the rotational axis of the hub 4.

A first side unit 9a accommodates a transformer unit 13, a gear oil unit 16 and a cooling unit 15. A second side unit 9b accommodates a converter unit 14 and a hydraulic unit 17.

The side units 9a, 9b are each mounted along a side of the main unit 8 in such a manner that one side unit 9a is mounted along a left side of the main unit 8 and the other side unit 9b is mounted along a right side of the main unit 8, as seen in a direction along a rotational axis of the hub 4 from the hub 4 towards a rear wall of the main unit 8. Accordingly, the nacelle 2 with the side units 9a, 9b mounted on the main unit 8 is wider than the main unit 8, while the length of the nacelle 2 is essentially identical to the length of the main unit 8. It is an advantage that the side units 9a, 9b are mounted in this manner relative to the main unit 8, because the weight of the wind turbine components 13, 14, 15, 16, 17 accommodated in the side units 9a, 9b is thereby arranged relatively close to the tower 3. Since the tower 3 carries the loads arising from the nacelle 2 and everything accommodated therein, the torque loads occurring in the nacelle 2 and in the tower 3 are reduced when the side units 9a, 9b are arranged as illustrated in FIGS. 2 and 3, as compared to a situation where additional units are arranged one behind the other along a direction defined by the rotational axis of the hub 4.

It is clear from FIG. 3 that the side units 9a, 9b are connected to the main unit 8 in such a manner that the interior parts of the main unit 8 and the side units 9a, 9b form one common interior space. Accordingly, once the side units 9a, 9b have been mounted on the main unit 8, a wide nacelle 2 with a large interior space for accommodating various components is provided. However, this is obtained without the drawbacks involved with transporting a nacelle with the same dimensions in one piece, because the nacelle 2 is made from the main unit 8 and the side units 9a, 9b, which are transported individually to the operating site.

Each of the side units 9a, 9b can be lowered directly from the position shown in FIGS. 2 and 3 towards the ground, because no beams or other structural parts protrude from the main unit 8 towards the side units 9a, 9b at a floor level of the nacelle 2. Similarly, the side units 9a, 9b can be hoisted directly from a lower level, e.g., a ground level, to the mounted position illustrated in FIGS. 2 and 3, e.g., during erection of the wind turbine. This is an advantage, because it allows the side units 9a, 9b, including the wind turbine components 13, 14, 15, 16, 17 accommodated therein, to be hoisted to or lowered from the mounted position by means of hoisting equipment (not shown) arranged in the nacelle 2. Furthermore, it allows the total weight which needs to be hoisted to the position at the top of the tower 3 to be divided into smaller portions, and the requirements to the lifting equipment used during erection of the wind turbine are thereby reduced.

Figure 4:
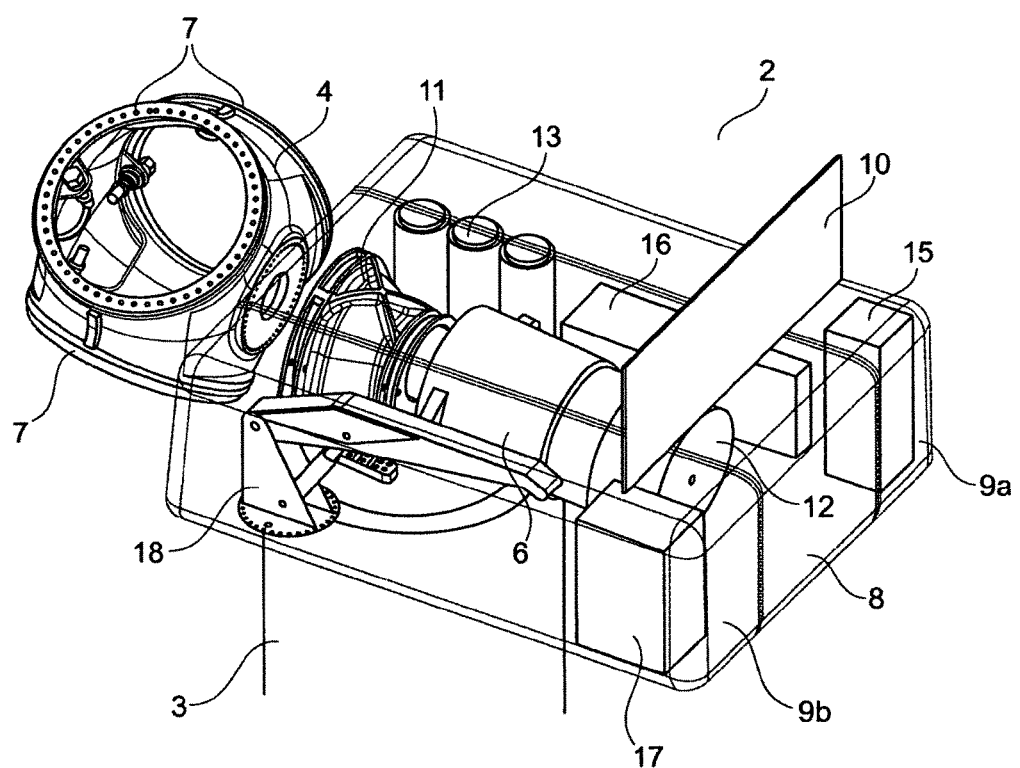
FIG. 4 is a perspective view of the nacelle of FIG. 2, wherein a side module has been replaced by a crane.

FIG. 4 is a perspective view of the nacelle 2 of FIG. 2. However, in FIG. 4 one of the side units (9b in FIG. 3) has been lowered from the nacelle 2. Instead a crane 18 has been hoisted to the nacelle 2 and mounted on the main unit 8, using the same interface which was used for mounting the side unit 9b to the main unit 8 in the situation illustrated in FIG. 3. The crane 18 is of a size which does not allow it to be permanently accommodated in the nacelle 2. However, it may sometimes be necessary or desirable to have such a crane 18 present in or at the nacelle 2. The crane 18 may, e.g., be used for moving some of the larger wind turbine components accommodated in the nacelle 2, e.g., the gear arrangement 6 or the generator 12. It is an advantage that the design of the nacelle 2 allows a larger and more powerful crane 18 to be available in the nacelle 2 in an easy manner, i.e., simply by lowering a side unit 9b from the nacelle 2 and hoisting the crane 18 to the position where the side unit 9b was previously mounted, because this allows easy access to such a crane 18 without the disadvantages relating to space consumption by having the crane 18 installed permanently in the nacelle 2.

Figure 5:
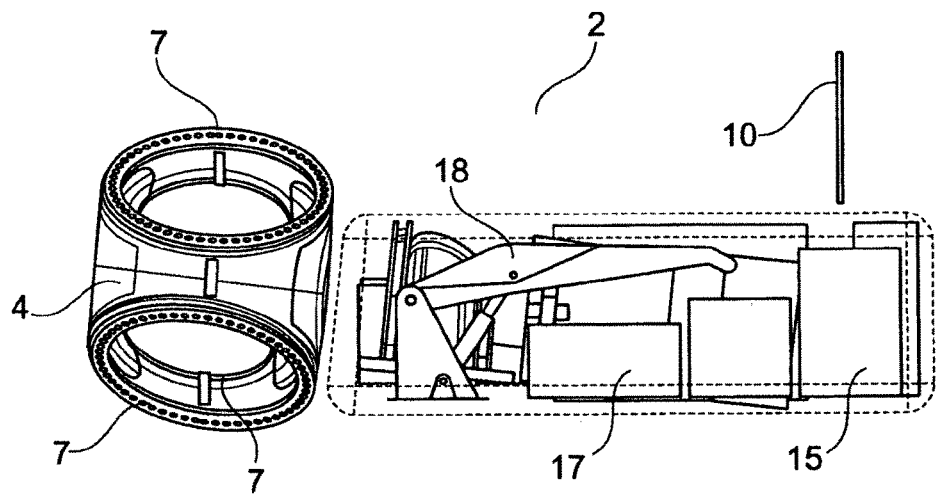
FIG. 5 is a side view of the nacelle according to a second embodiment of the invention.
Figure 6:
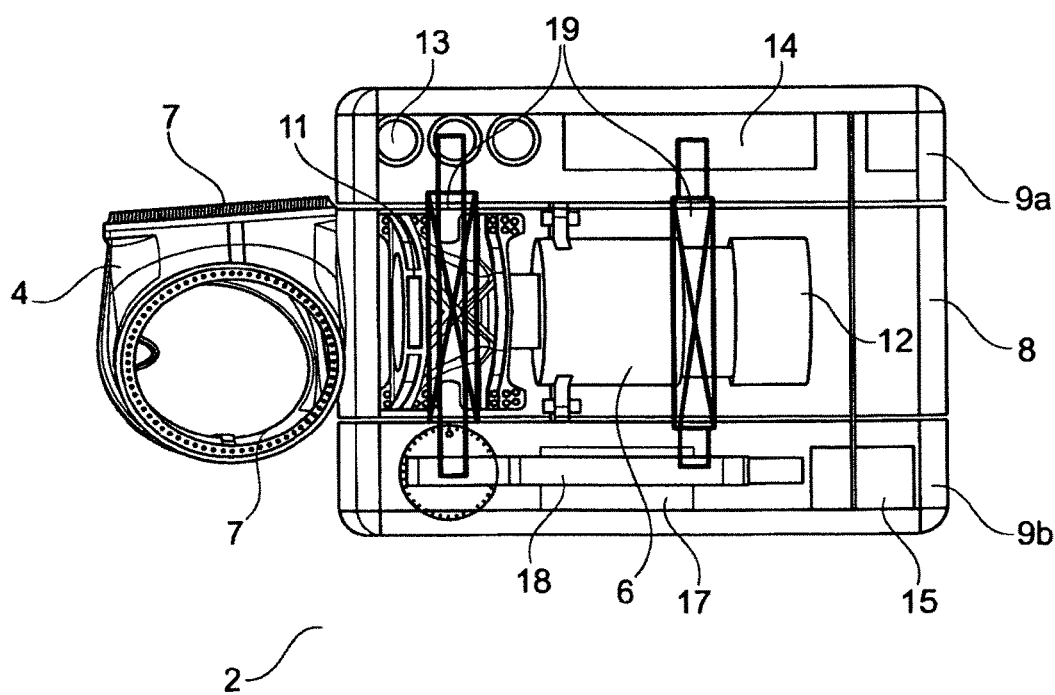
FIG. 6 is a top view of the nacelle of FIG. 5.

FIG. 5 is a side view of a nacelle 2 according to a second embodiment of the invention, and FIG. 6 is a top view of the nacelle 2 of FIG. 5. In FIG. 6 the roof of the nacelle 2 has been removed in order to reveal the interior of the nacelle 2 and the wind turbine components accommodated therein. These components have already been described above with reference to FIGS. 3 and 4, and will therefore not be described in further detail here. The embodiment illustrated in FIGS. 5 and 6 is very similar to the embodiment illustrated in FIGS. 2-4. However, in FIGS. 5 and 6, the converter unit 14 is accommodated in the side unit 9a which also accommodates the transformer unit 13. Thus, the electrical wind turbine components 13, 14 are accommodated in the first side unit 9a, and the liquid containing wind turbine components 16, 17 are accommodated in the second side unit 9b. This is an advantage, because the risk that the electrical wind turbine components 13, 14 get into contact with liquid is thereby reduced. Furthermore, it is an advantage that the converter unit 14 is arranged immediately next to the transformer 13 as well as immediately next to the generator 12, because the current paths between these components are thereby minimized as described in detail above.

In FIG. 6 two lifting beams 19 are visible. The lifting beams 19 are arranged transversally across the main unit 8 of the nacelle 2. During erection of the wind turbine, the main unit 8 may be hoisted to the position on top of the tower by coupling the lifting beams 19 to lifting equipment, such as a large crane, and lifting the main unit 8 in position by means of the lifting equipment and via the lifting beams 19. Furthermore, the lifting beams 19 may be equipped with hoisting equipment used for hoisting the side units 9a, 9b and/or the wind turbine components 13, 14, 15, 16, 17 to the mounted position. Similarly, such hoisting equipment may be used for lowering the side units 9a, 9b and/or the wind turbine components 13, 14, 15, 16, 17 at a later time. Finally, the lifting beams 19 may be used for mounting one or more of the heavy wind turbine components, e.g., the transformer 13 or the converter 14 after the side unit 9a has been hoisted to the nacelle 2 and mounted on the main unit 8. In this case the weight of these wind turbine components is carried by the main unit 8 during normal operation of the wind turbine.

Figure 7:
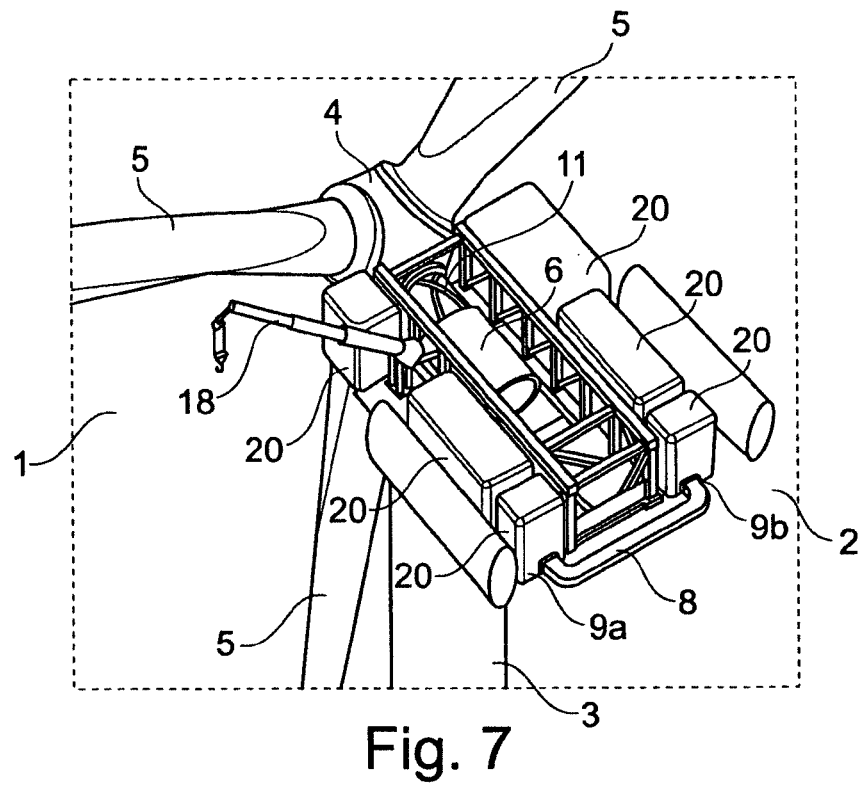
FIG. 7 is a perspective view of a wind turbine comprising a nacelle according to a third embodiment of the invention.

FIG. 7 is a perspective view of a wind turbine 1 with a nacelle 2 according to a third embodiment of the invention mounted on a tower 3 thereof. A hub 4 carrying three rotor blades 5 is mounted at the nacelle 2. The nacelle 2 is shown without a cover or top part in order to reveal the interior parts of the nacelle 2.

The nacelle 2 comprises a main unit 8 and two side units 9a, 9b, similarly to the embodiment shown in FIG. 2. A main bearing unit 11 and a gear arrangement 6 are accommodated in the main unit 8. Each of the side units 9a, 9b accommodates three closed compartments 20. Each of the closed compartments 20 accommodates one or more wind turbine components, such as generator, transformer, converter, cooling devices, oil units, hydraulic units, etc. Since the wind turbine components are arranged in the closed compartments 20, it is possible to customize various environmental parameters, such as temperature, humidity, moisture, etc., to the wind turbine component(s) accommodated in a specific closed compartment 20, without taking requirements of other wind turbine components into consideration. Furthermore, it is easier to control the environment inside a closed compartment 20 than in the entire interior part of the nacelle 2, because the volume of one of the closed compartments 20 is significantly smaller than the volume of the entire interior part of the nacelle 2.

Furthermore, the wind turbine components can be arranged in the closed compartments 20 at the manufacturing site and transported to the operating site of the wind turbine 1 in the closed compartments 20, and the closed compartments 20, along with the wind turbine components accommodated therein, can be mounted in the nacelle 2. This makes it easy to install the wind turbine components in the nacelle 2.

Figure 8:
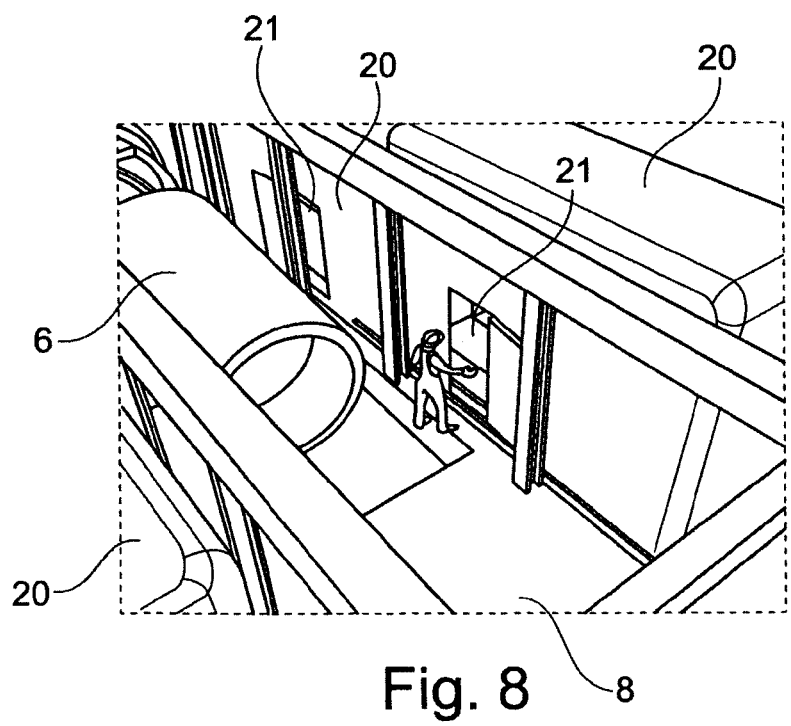
FIG. 8 shows a detail of the nacelle illustrated in FIG. 7.
Figure 9:
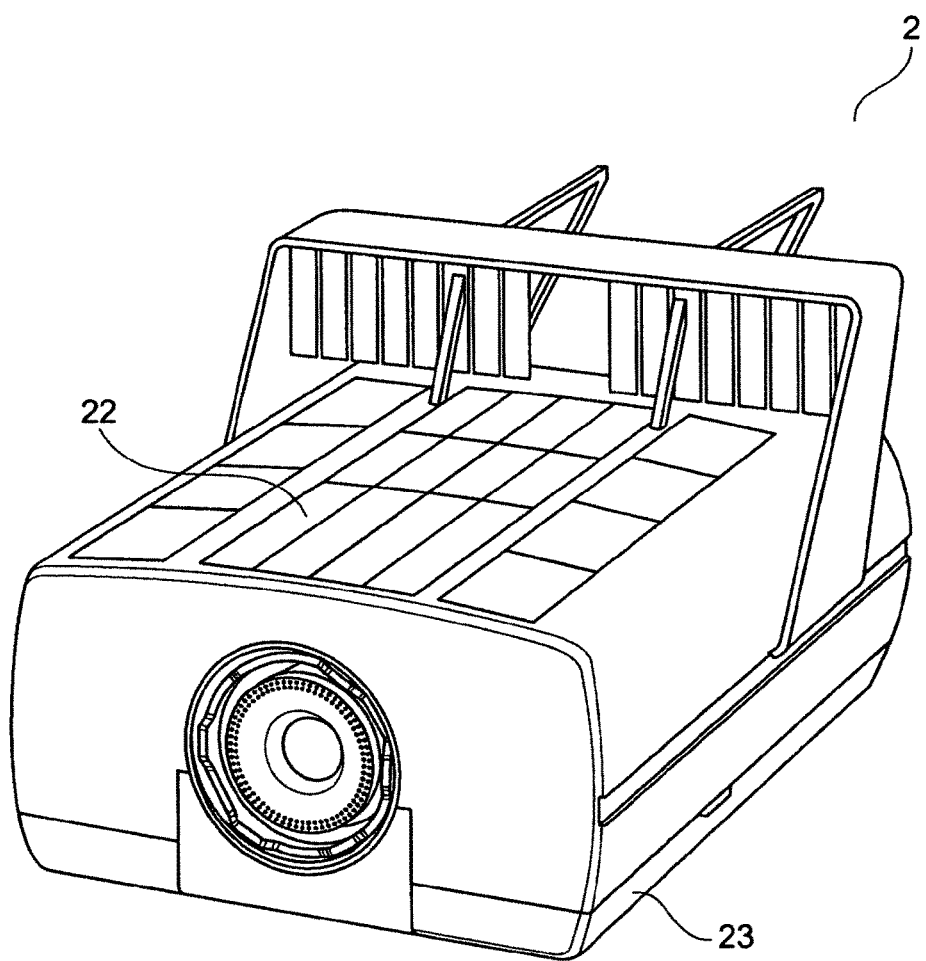
FIG. 9 is a perspective view of a nacelle according to a fourth embodiment of the invention.

FIG. 8 shows a detail of the nacelle 2 illustrated in FIG. 7. Part of the main unit 8, accommodating the gear arrangement 6, and three closed compartments 20 are visible. The closed compartments 20 are provided with openings 21 allowing access to the interior parts of the closed compartments 20. The openings 21 may be provided with doors or hatches (not shown) which may be closed during normal operation of the wind turbine, thereby substantially enclosing the wind turbine components accommodated in the closed compartments 20. When access to the wind turbine components is required, e.g., in order to perform inspection, maintenance or replacement of one or more wind turbine components, the door or hatch of the relevant closed compartment 20 can be opened, thereby allowing access to the wind turbine components accommodated in the closed compartment 20, via the opening 21. FIG. 9 is a perspective view of a nacelle 2 according to a fourth embodiment of the invention. The nacelle 2 comprises a main unit and two side units, similarly to the embodiments described above. In the nacelle 2 shown in FIG. 9, a common upper cover 22 and a common lower cover 23 enclose the main unit as well as the side units. Accordingly, the main unit and the side units are not visible in FIG. 9.

Figure 10:
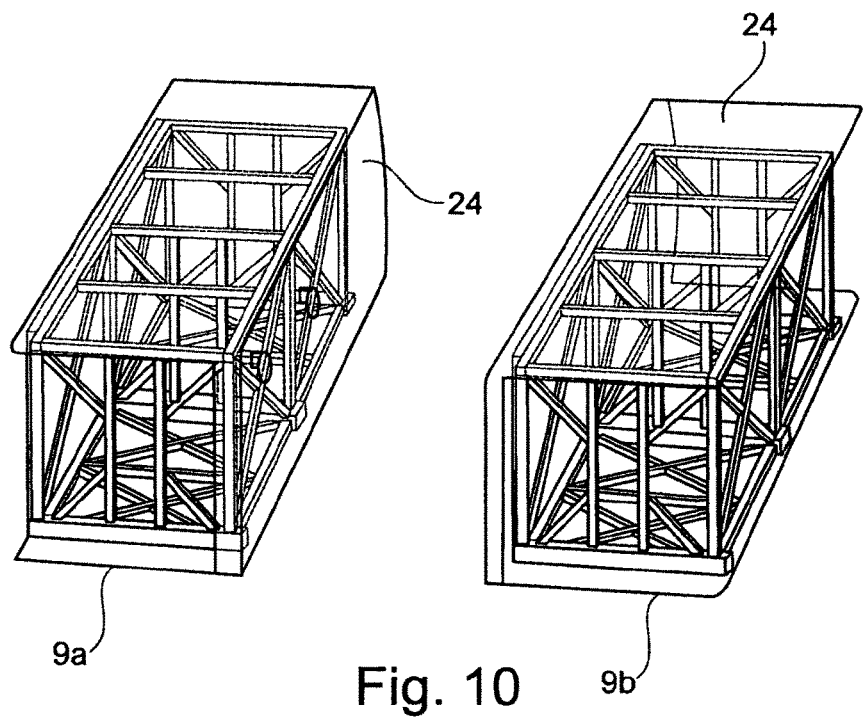
FIGS. 10 and 11 illustrate two side units for use in a nacelle according to an embodiment of the invention.
Figure 11:
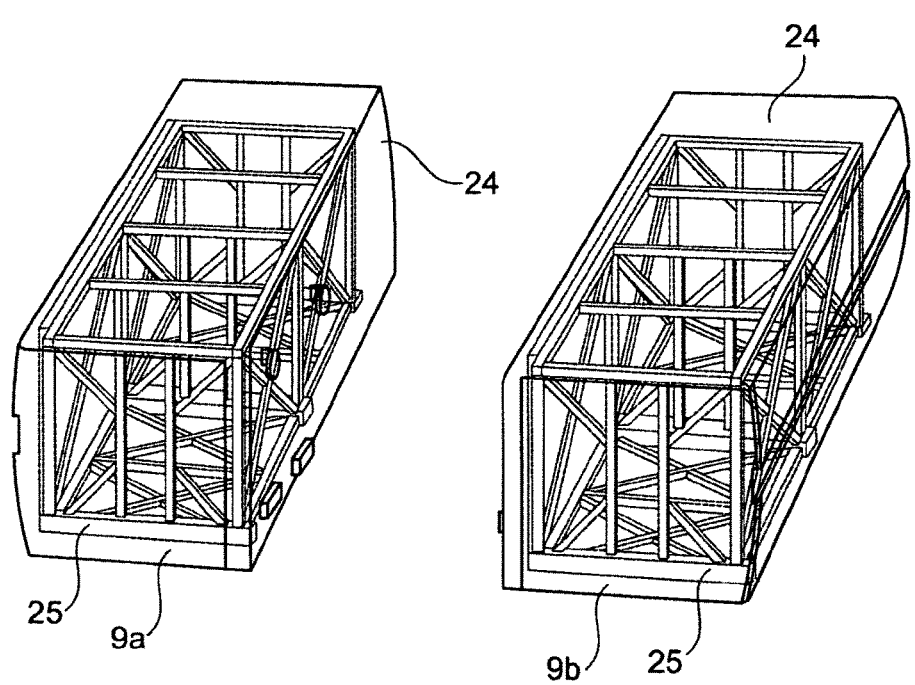

FIGS. 10 and 11 show side units 9a, 9b for use in a nacelle according to an embodiment of the invention. In FIG. 10 each of the side units 9a, 9b is provided with a transportation cover 24, covering three sides of the side unit 9a, 9b. In FIG. 11 each side unit 9a, 9b is further provided with a side cover 25 covering the remaining three sides of the side unit 9a, 9b. Thus, it is clear from FIG. 11 that the transportation cover 24 and the side cover 25 in combination completely enclose the side unit 9a, 9b. The side cover 25 is permanently mounted on the side unit 9a, 9b in the sense that it is mounted on the side unit 9a, 9b at the manufacturing site, and it forms part of the outer walls of the nacelle when the side unit 9a, 9b is mounted on a main unit.

The transportation cover 24, on the other hand, is only mounted on the side unit 9a, 9b during transportation of the side unit 9a, 9b in order to protect the side unit 9a, 9b during the transportation. Thus, the transportation cover 24 should be removed before the side unit 9a, 9b is mounted on a main unit, thereby assembling the nacelle.

Figure 12:
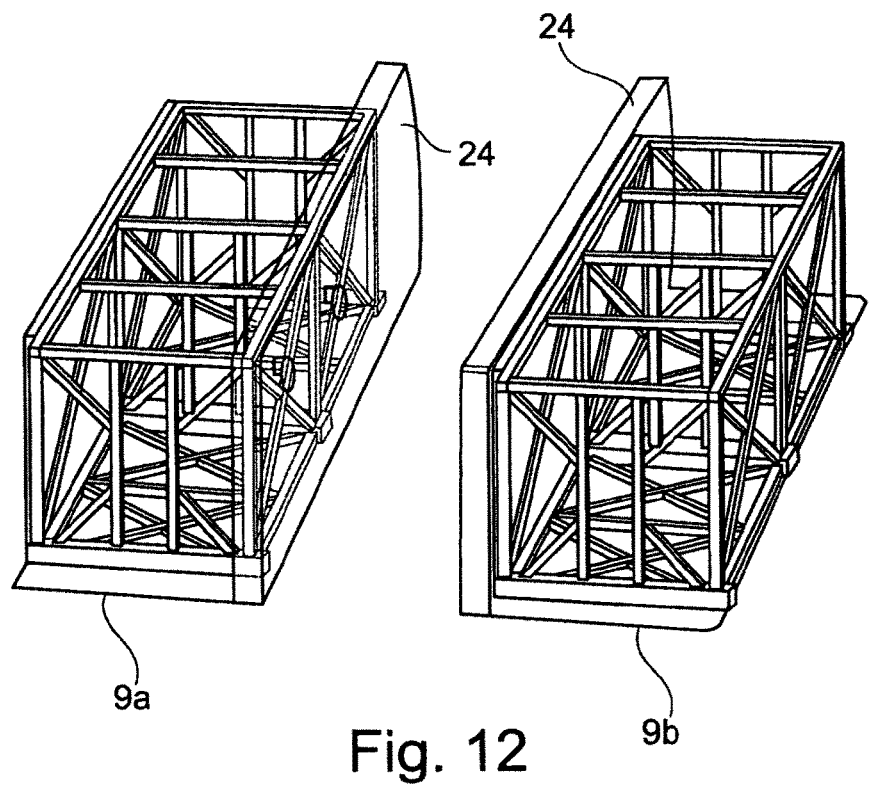
FIGS. 12 and 13 illustrate two side units for use in a nacelle according to an alternative embodiment of the invention.
Figure 13:
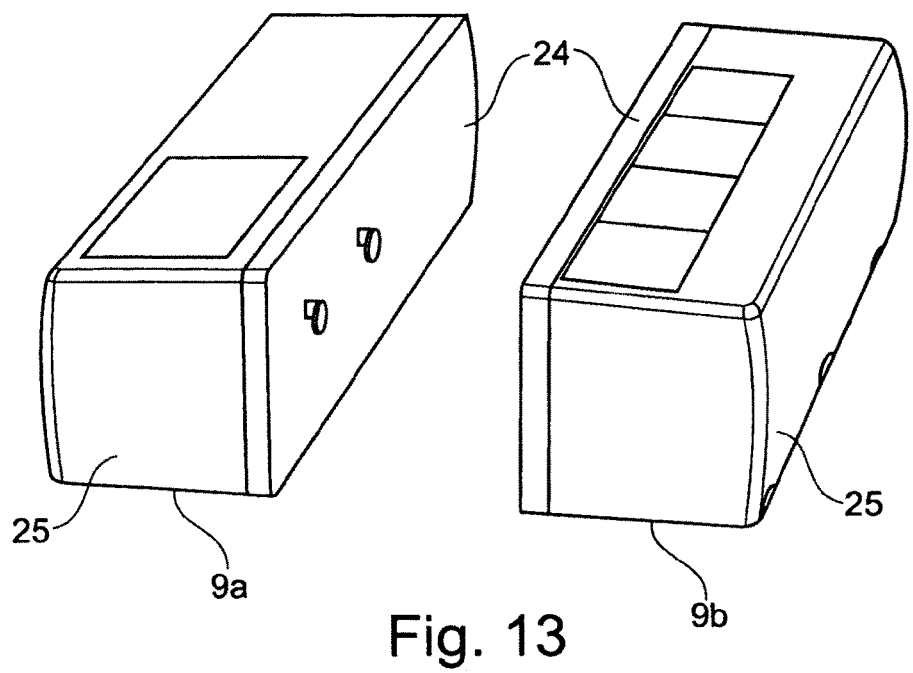

FIGS. 12 and 13 show side units 9a, 9b for use in a nacelle according to an alternative embodiment of the invention. The side units 9a, 9b are provided with transportation covers 24 and side covers 25, similarly to the side units 9a, 9b shown in FIGS. 10 and 11. However, in FIGS. 12 and 13, the transportation covers 24 cover two sides of each side unit 9a, 9b, and the side covers 25 cover four sides of each side unit 9a, 9b.

Figure 14:
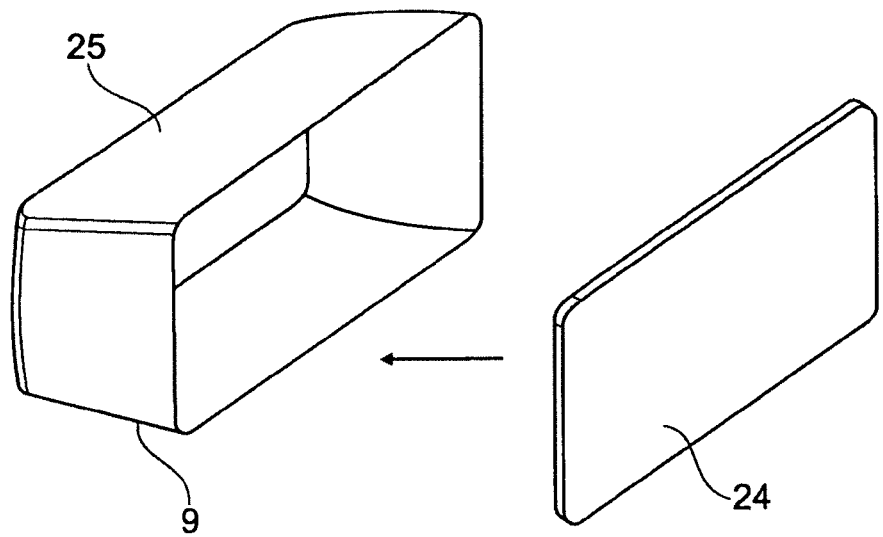
FIGS. 14 and 15 are perspective views of side units comprising a transportation cover.

FIG. 14 is a perspective view of a side unit 9 for use in a nacelle according to an embodiment of the invention. The side unit 9 is provided with a side cover 25 covering five sides of the side unit 9, thereby leaving only one side of the side unit 9 open. The open side forms an interface of the side unit 9 towards a main unit, and a common interior space can thereby be formed by the side unit 9 and the main unit when they are assembled to form the nacelle.

A transportation cover 24 is also illustrated in FIG. 14, and it is indicated that the transportation cover 24 can be mounted on the side unit 9 in such a manner that it covers the open side of the side unit 9. Thus, as described above, the transportation cover 24 can be mounted on the side unit 9 at the manufacturing site, and the side unit 9 can be transported from the manufacturing site to the operating site of the wind turbine, or to an assembly site of the nacelle, thereby protecting the side unit 9 and any parts or items arranged in the interior part of the side unit 9 during transportation. Prior to assembling the nacelle, the transportation cover 24 is removed.

Figure 15:
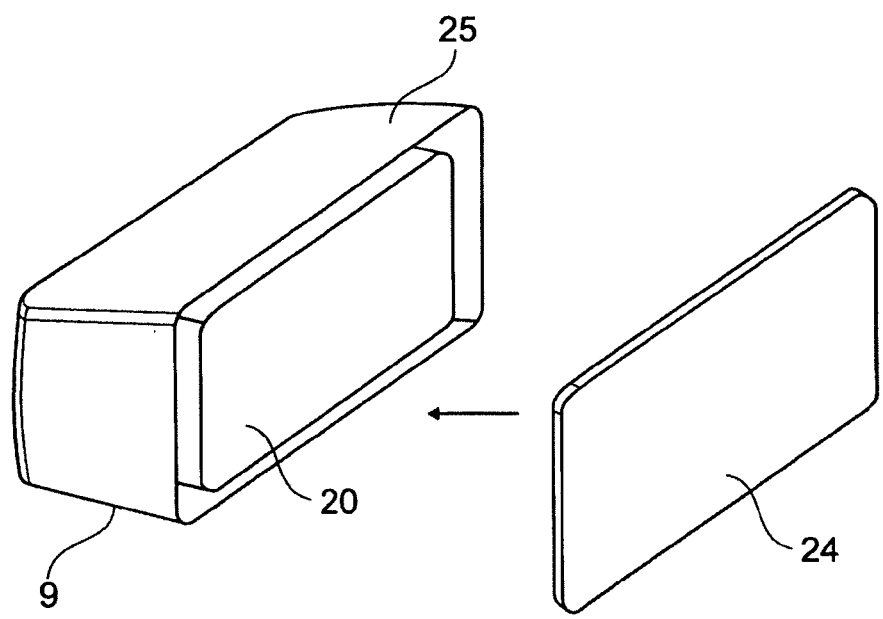

FIG. 15 is a perspective view of a side unit 9 which is similar to the side unit 9 illustrated in FIG. 14. The remarks set forth above with reference to FIG. 14 are therefore equally applicable here. However, in the side unit 9 of FIG. 15, a closed compartment 20 is accommodated in the side unit 9. Thus, when the side unit 9 is transported from the manufacturing site to the operating site of the wind turbine, or to an assembly site of the nacelle, the closed compartment 20, and any wind turbine components accommodated therein, is transported along.

Figure 16:
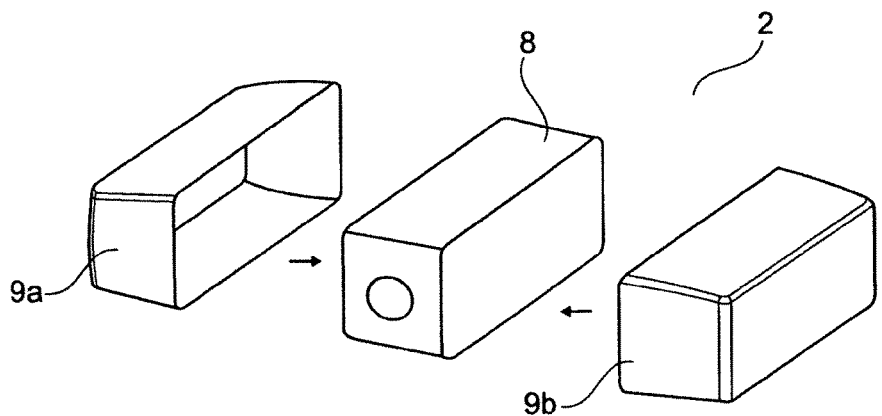
FIG. 16 is a schematic view of a nacelle according to a fifth embodiment of the invention.

FIG. 16 is a schematic view of a nacelle 2 according to a fifth embodiment of the invention. The nacelle 2 comprises a main unit 8 and two side units 9a, 9b. The main unit 8 and the side units 9a, 9b are shown detached from each other, but it is indicated that the side units 9a, 9b can be mounted on opposing sides of the main unit 8. Thereby a nacelle 2 similar to the nacelle illustrated in FIG. 2 is obtained.

Figure 17:
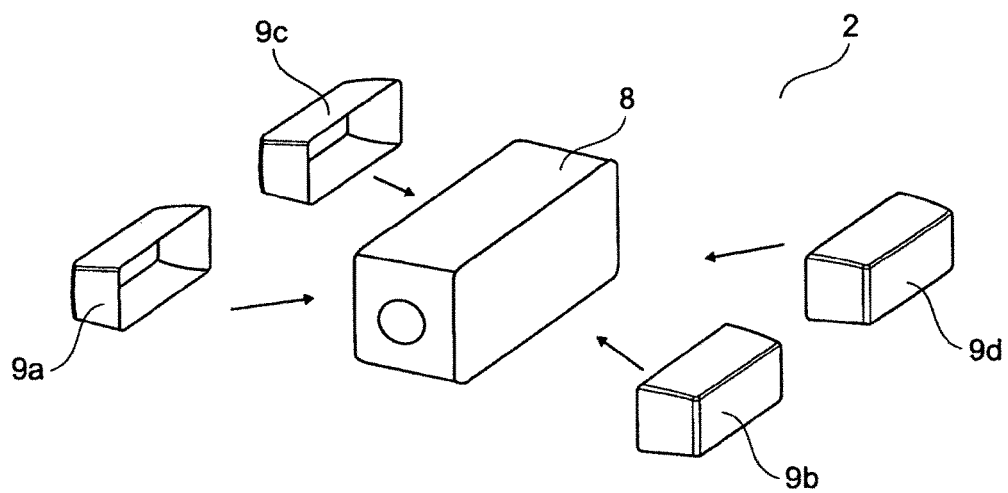
FIG. 17 is a schematic view of a nacelle according to a sixth embodiment of the invention.

FIG. 17 is a schematic view of a nacelle 2 according to a sixth embodiment of the invention. The nacelle 2 comprises a main unit 8 and four side units 9a, 9b, 9c, 9d. The main unit 8 and the side units 9a, 9b, 9c, 9d are shown detached from each other, but it is indicated that the side units 9a, 9b, 9c, 9d can be mounted on the main unit 8 with two of the side units 9a, 9c being mounted along one side of the main unit 8, and two of the side units 9b, 9d being mounted along an opposing side of the main unit 8. The combined length of the side units 9a, 9c corresponds to the length of the main unit 8. Similarly, the combined length of the side units 9b, 9d corresponds to the length of the main unit 8.

Figure 18:
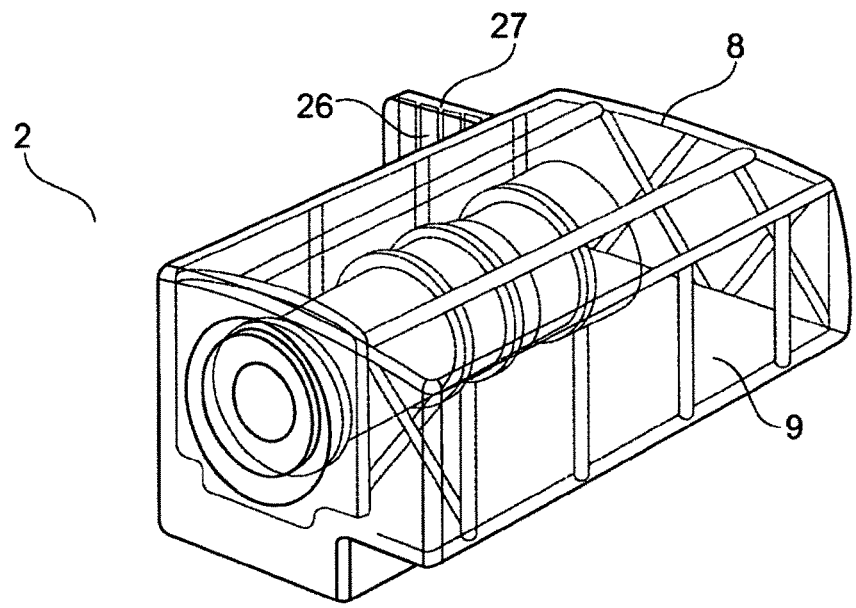
FIGS. 18-21 illustrate a nacelle according to a seventh embodiment of the invention.
Figure 19:
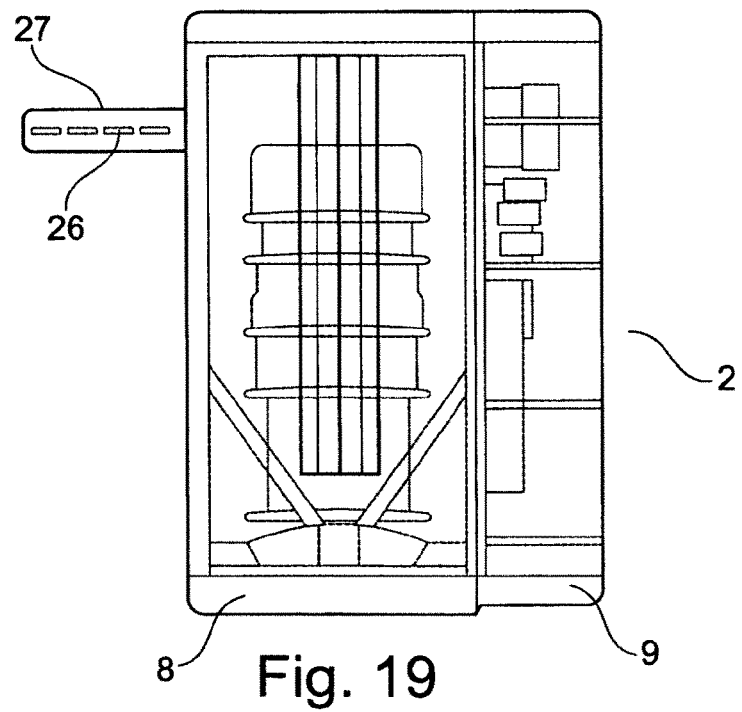
Figure 20:
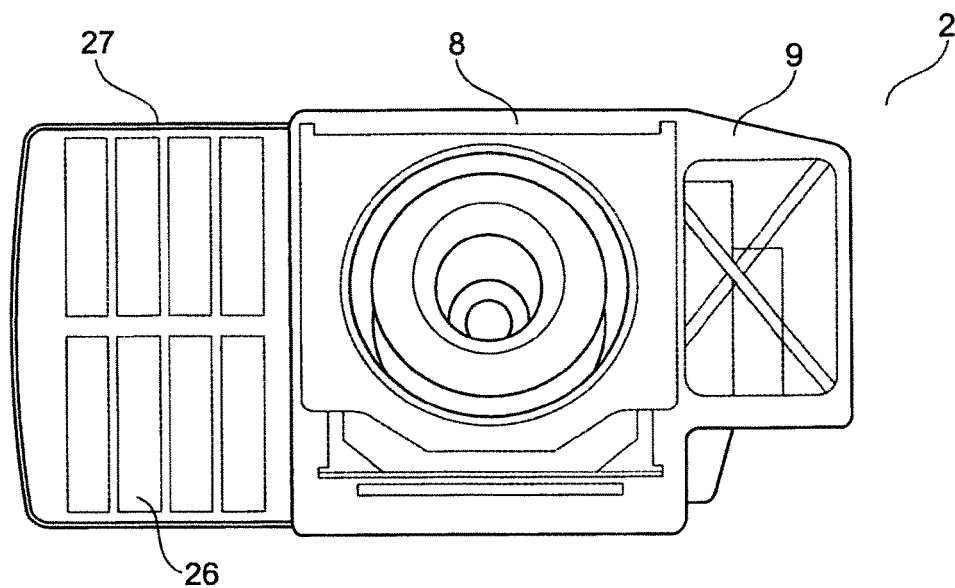
Figure 21:
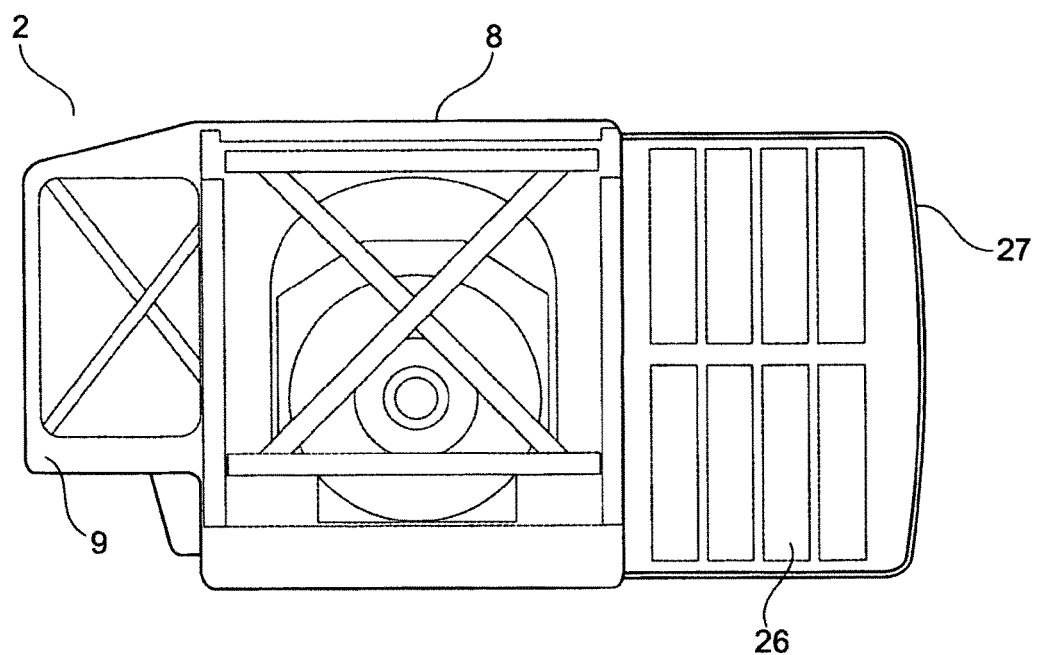

FIGS. 18-21 illustrate a nacelle 2 according to a seventh embodiment of the invention. FIG. 18 is a perspective view of the nacelle 2, FIG. 19 is a top view of the nacelle 2, FIG. 20 is a front view of the nacelle 2, and FIG. 21 shows the nacelle 2 from the back.

The nacelle 2 of FIGS. 18-21 comprises a main unit 8 and a side unit 9 mounted along a side of the main unit 8. A cooling device 26 is mounted on a side of the main unit 8 which is arranged opposite to the side having the side unit 9 mounted thereon. The cooling device 26 defines a cooling area which extends from the main unit 8, the cooling device 26 thereby being able to exchange heat with the air surrounding the nacelle 2. Accordingly, the cooling device 26 is able to provide cooling for one or more heat producing components of the nacelle 2, such as a generator, a transformer, a gear box, a frequency converter, etc.

A cooling cover 27 is arranged to partly cover the cooling device 26. Thus the cooling device 26 is thereby enclosed by a part of the side of the main unit 8 having the cooling device 26 mounted thereon, and inner sides of the cooling cover 27.

The invention claimed is:

1. A nacelle for a wind turbine, comprising:
   a main unit arranged to be connected to a wind turbine tower, via a yawing arrangement, the main unit having a top, a bottom, and at least one side between the top and bottom, the main unit having an interior; and
   at least one side unit mounted along the at least one side of the main unit in such a manner that the main unit and the at least one side unit are distributed side-by-side along a substantially horizontal direction which is substantially transverse to a rotational axis of a rotor of the wind turbine, the at least one side unit having an interior,
   wherein a substantially vertical wall extends between the main unit and the at least one side unit to separate the interior of the main unit and the interior of the at least one side unit, the wall including a first door to allow passage between the interior of the main unit and the interior of the at least one side unit in the substantially horizontal direction, and
   wherein at least one wind turbine component is mounted within the interior of and supported by the at least one side unit.

2. The nacelle according to claim 1, wherein the wall includes a second door spaced apart from the first door, the second door allowing passage between the interior of the main unit and the interior of the at least one side unit in the substantially horizontal direction.

3. The nacelle according to claim 2, wherein the interior of the at least one side unit includes first and second closed compartments, the at least one wind turbine component being arranged in one of the first and second closed compartments, one of the first and second closed compartments includes a door to allow access to the at least one wind turbine component.

4. The nacelle according to claim 3, wherein the one of the first and second closed compartments with the at least one wind turbine component provides electromagnetic shielding for the at least one wind turbine component therein.

5. The nacelle according to claim 1, wherein the at least one side of the main unit defines a mounting plane and no structural component associated with the main unit protrudes through the mounting plane such that the at least one side unit may be hoisted directly adjacent and substantially parallel to the mounting plane of the main unit.

6. The nacelle according to claim 1, wherein the at least one side unit comprises a supporting structure, the at least one wind turbine component being mounted to the supporting structure.

7. The nacelle according to claim 1, wherein the main unit comprises at least one beam, the at least one beam being connectable to lifting equipment for mounting and/or demounting the main unit on/from the wind turbine tower.

8. The nacelle according to claim 7, wherein the at least one beam forms part of a hoisting arrangement for hoisting and/or lowering the at least one wind turbine component and/or the at least one side unit to/from the nacelle.

9. The nacelle according to claim 7, wherein the at least one beam is adapted to carry the at least one wind turbine component accommodated in the at least one side unit.

10. The nacelle according to claim 1, wherein the least one wind turbine component mounted within the interior of and supported by the at least one side unit is a transformer.

11. The nacelle according to claim 10, wherein a converter is also mounted within the interior of and supported by the at least one side unit.

12. The nacelle according to claim 11, wherein the converter is arranged adjacent to the transformer and adjacent to a generator of the wind turbine.

13. The nacelle according to claim 10, wherein the transformer is arranged at a position near the yawing arrangement.

14. The nacelle according to claim 1, wherein the at least one wind turbine component mounted within the interior of and supported by the at least one side unit is an on-board crane.

15. The nacelle according to claim 1, wherein the at least one side unit extends substantially along the entire length of the main unit.

16. The nacelle according to claim 1, wherein an interface defined by the main unit towards the at least one side unit is connectable to a corresponding interface of a crane, upon removal of the at least one side unit.

17. The nacelle according to claim 1, wherein the at least one side unit is adapted to accommodate the at least one wind turbine component during transport from a manufacturing location to a wind turbine site.

18. The nacelle according to claim 1, further comprising a cover covering at least part of the main unit and at least part of the at least one side unit.

19. The nacelle according to claim 1, further comprising a main cover covering at least part of the main unit, and at least one side cover covering at least part of the at least one side unit.

20. The nacelle according to claim 1, wherein the at least one side of the main unit includes first and second opposed sides, wherein the at least one side unit comprises one side unit mounted along the first side of the main unit and a cooling device having a cooling area is mounted to and extends from the second side of the main unit, the one side unit on the first side and the cooling device on the second side providing an asymmetric configuration of the nacelle.

21. The nacelle according to claim 20, comprising a cooling cover having at least one inner face, the cooling device being enclosed by a face of the second side of the main unit and the inner face of the cover.

22. A wind turbine comprising a nacelle according to claim 1.

23. A method for erecting a wind turbine comprising a nacelle comprising:
   erecting a wind turbine tower,
   mounting a main unit on the wind turbine tower, via a yawing arrangement, the main unit having a top, a bottom, and at least one side between the top and bottom, the at least one side defining a mounting plane,
   hoisting at least one side unit to a position adjacent to the at least one side of the main unit, wherein no structural component associated with the main unit protrudes through the mounting plane such that the at least one side unit is hoisted directly adjacent and substantially parallel to the mounting plane of the main unit, and
   connecting the at least one side unit to the at least one side of the main unit in such a manner that the main unit and the at least one side unit are distributed side-by-side along a substantially horizontal direction which is substantially traverse to a rotational axis of a rotor of the wind turbine.

24. The method according to claim 23, further comprising transporting the at least one side unit having at least one wind turbine component mounted therein from a manufacturing location to a wind turbine site, prior to performing the step of hoisting the at least one side unit.

25. The method according to claim 24, further comprising;
   disconnecting the at least one side unit having the at least one wind turbine component from the at least one side of the main unit,
   lowering the at least one side unit from the main unit directly adjacent and substantially parallel to the mounting plane of the main unit.

26. The method according to claim 23, wherein the at least one side unit includes at least one wind turbine component mounted therein prior to the at least one side unit being hoisted.

27. The method of claim 23, wherein the main unit has an interface to which the at least one side unit is connected, the method further comprising:
   disconnecting the at least one side unit from the interface of the main unit;
   lowering the at least one side unit;
   hoisting a crane to a position adjacent the interface; and
   connecting the crane to the interface.

28. A nacelle for a wind turbine, comprising:
   a main unit arranged to be connected to a wind turbine tower, via a yawing arrangement, the main unit having a top, a bottom, and at least one side between the top and bottom, the main unit having an interior; and
   a first side unit and a second side unit mounted along the at least one side of the main unit in such a manner that the main unit and each of the first side unit and the second side unit are distributed side-by-side along a substantially horizontal direction which is substantially transverse to a rotational axis of a rotor of the wind turbine, each of the first side unit and the second side unit having an interior,
   wherein a substantially vertical wall extends between the main unit and the first side unit and the second side unit to separate the interior of the main unit and the interior of the first side unit and the second side unit, the wall including a first door to allow passage between the interior of the main unit and the interior of one of the first side unit or the second side unit in the substantially horizontal direction, and
   wherein at least one wind turbine component is mounted within the interior of and supported by one of the first side unit or the second side unit.

\* \* \* \* \*